United States Patent [19]
Mansfield

[11] Patent Number: 4,760,956
[45] Date of Patent: Aug. 2, 1988

[54] INTERNAL MIX PLURAL COMPONENT SYSTEM

[75] Inventor: Gregory A. Mansfield, Indianapolis, Ind.

[73] Assignee: Glas-Craft, Inc., Indianapolis, Ind.

[21] Appl. No.: 885,009

[22] Filed: Jul. 14, 1986

[51] Int. Cl.[4] .......................... A62C 1/12; B05B 7/06; B05B 1/28
[52] U.S. Cl. ........................................ 239/8; 239/294; 239/299; 239/419.3; 239/424; 239/432
[58] Field of Search .................... 239/290, 294, 299, 8, 239/400, 416.1, 416.5, 419.3, 422-424, 428, 432, 434.5

[56] References Cited

U.S. PATENT DOCUMENTS

| | | | |
|---|---|---|---|
| D. 252,097 | 6/1979 | Probst et al. | D23/17 |
| 2,042,746 | 6/1936 | Tracy | 239/600 X |
| 3,202,363 | 8/1986 | Kautz et al. | 239/413 |
| 3,330,484 | 7/1965 | Johnson et al. | 239/414 |
| 3,399,834 | 9/1965 | Bradley | 239/10 |
| 3,521,824 | 7/1970 | Wilcox | 239/424.5 |
| 3,542,296 | 11/1970 | Bradley | 239/306 |
| 3,589,621 | 6/1971 | Bradley | 239/526 |
| 3,622,080 | 11/1971 | Greenwood | 239/426 |
| 3,635,400 | 1/1972 | Nord et al. | 239/15 |
| 3,716,190 | 2/1973 | Lindlof | 239/8 X |
| 3,759,450 | 9/1973 | Fram et al. | 239/427 |
| 3,763,876 | 10/1973 | Freeman et al. | 137/114 |
| 3,799,403 | 3/1974 | Probst et al. | 222/135 |
| 3,843,052 | 10/1974 | Cowan et al. | 237/3 |
| 4,330,086 | 5/1982 | Nysted | 239/432 X |
| 4,386,739 | 6/1983 | Kwok | 239/296 |
| 4,501,394 | 2/1985 | Kwok | 239/296 |
| 4,527,507 | 7/1985 | Sawai | 239/299 X |

FOREIGN PATENT DOCUMENTS 90762 6/1982 Japan ................................. 239/290

OTHER PUBLICATIONS

Glas-Craft, Inc., LPA Low Pressure Airless Product Sheet.
Glas-Craft, Inc., ISD Spray Up System Product.

Primary Examiner—Andres Kashnikow
Assistant Examiner—Patrick N. Burkhart
Attorney, Agent, or Firm—Willian Brinks Olds Hofer Gilson & Lione

[57] ABSTRACT

An internal mix, air-assisted, airless atomization, plural component spraying system includes a source of resin; a source of catalyst for the resin; a spray gun to mix the resin and catalyst and direct the mixture as a spray to a substrate; and a source of compressed air to assist in atomization of the mixed resin and catalyst. The spray gun includes a mixing apparatus and an atomizer including a liquid nozzle for forming the mixed resin and catalyst into a fan-like film with expanding edges extending from a liquid orifice, and an air nozzle for forcing a flow of compressed air to converge at an elongated air orifice and expand in a fan-like flow. The mixing apparatus includes a first internal passageway for receiving a flow of resin having a portion of restricted diameter opening into an expanding passageway portion and one or more radial second passageways opening into the restricted diameter portion for delivering catalyst into the first passageway so that the resin and catalyst are thoroughly mixed by a venturi effect at substantially lower pressures than in prior systems. The compressed air flow is juxtaposed to and interacts with the fan-like film of mixed resin and catalyst to assist in atomization and provide atomized particles of uniform, small size and to further mix the mixed catalyst and resin particles.

18 Claims, 4 Drawing Sheets

INTERNAL MIX PLURAL COMPONENT SYSTEM

BACKGROUND OF THE INVENTION

The present invention relates generally to multi-component spraying systems and, more particularly, to an internal mix, air-assisted, airless atomization, plural component spraying system and method.

Multi-component spraying systems are used in manufacturing plastic articles by applying resinous materials to a mold or preform for an article. In such systems, a liquid resin and a catalyst for the resin are formed into spray particles directed to a substrate where the catalyst and resin react and harden to form the article. In such applications, the resin and catalyst components are preferably mixed together; and the mixture is sprayed onto the substrate. For example, in manufacturing articles with polyester resin, a catalyzing agent for the polyester resin is mixed with the resin; and the resin-catalyst mixture is applied to the substrate. In internal mix systems, the resin and catalyst are mixed within the spraying apparatus; and the mixture is atomized by a spray nozzle and directed onto the substrate. In external mix systems, the resin and catalyst are mixed externally of the apparatus after the resin and catalyst have been atomized. In both external mix and internal mix systems, complete and thorough mixing of the resin and catalyst is important to avoid non-uniform hardening of the resin on the substrate and other undesirable results.

To effect mixing, internal mix systems have incorporated fluid division mixers to intermingle the plural components of a catalyzed resin system within the spray gun. An additional mixing stage in the form of a baffle is also frequently incorporated into such internal mix systems to provide for this component intermingling within the spray gun. Such an internal mix system is shown in U.S. Pat. No. 3,759,450, and can be effective where further mixing of the resin and catalyst can be effected by spraying. Internal mix systems have also incorporated swirl chambers to effect component mixing within the spray gun. In internal mix systems using swirl chamber mixers, the resin and catalyst are injected into the swirl chamber at high velocities to create turbulence and intermixing of the two components.

Such internal mix systems are not entirely satisfactory, however, in plural component spraying systems. Because the chambers in which mixing occurs are open to the fluid pressures of both the resin delivery system and the catalyst delivery system, the fluid pressures produced by both systems must be approximately equal to avoid either of the fluid components from being forced through the orifice by which the other component is introduced into the mixing chamber. This problem is particularly acute in internal mix systems with swirl chambers where the orifices by which the resin and catalyst are introduced into the swirl chamber are frequently opposed and direct their high velocity streams at each other to effect greater turbulence and mixing. Where the orifices by which the resin and catalyst are injected to a swirl chamber are not so opposed, mixing of the resin and catalyst is not so well effected because of the velocity of the components and their short exposure to mixing. If the pressures by which the resin and catalyst are introduced into internal mix systems are not carefully controlled to be about equal and the resin and catalyst delivery systems are not simultaneously operated, either resin or catalyst may be forced into the fluid delivery system components of the other component where, because of the mixing of the components, catalyzed resin may harden and require replacement of system components.

Because internal mixing takes place with a hand-held and manipulated spray gun in commercial plural component spraying systems of the internal mix type, mixing of the two components must be effected within a small, lightweight, and easily manipulated structure. The limitations of size and weight inhibit thorough mixing by the internal mix structure within the spray gun, and further mixing must be effected in the operation of the spray gun for effective manufacture of articles from internal mix, plural component spraying systems.

In many spraying systems, large quantities of pressurized air are used to atomize the liquid components. Such systems are expensive to operate and have a number of operational inadequacies. It is expensive to compress air, and the large quantities of compressed air used by existing systems impose a significant operating cost on the system. In addition, the blast of compressed air used to atomize the liquid components carries a significant quantity of spray particles away from the substrate, wastes the expensive resin and catalyst, creates an unclean spray area and sometimes requires overspray collection systems, and contributes to the problem of operating such manufacturing operations safely. Furthermore, the use of large quantities of air during operation of the system can often create an undesirable spread of fumes.

In order to overcome some of the inadequacies attending the use of pressurized air to atomize components dispensed from a spraying apparatus, spraying systems have been developed which incorporate airless atomization techniques.

In prior airless atomization devices, an airless spray nozzle has been used to atomize liquid materials which are pumped at high pressure, that is, pressures generally exceeding 500–600 p.s.i. and more frequently in excess of 800 p.s.i., typical operating pressure being 1000–1500 p.s.i. The most commonly used airless nozzle includes an internal, hemispherical passage termination which is cut through by an external V-shaped groove to form an elongated, elliptical-like orifice. Liquid material pumped at high pressures through such a spray nozzle is forced by the hemispherical termination of the passageway to converge in its flow at and through the elongated orifice. Because of the converging flow at the orifice, the liquid material is expelled through the orifice into an expanding fan-like film which breaks into spray particles which are carried by their momentum to the article target. Flow convergence at the elongated orifice is believed to be basic to the fan-like film produced in airless atomization. The mechanism by which the fan-like film is broken into spray particles is apparently a combination of its velocity and interaction with the relatively quiescent air through which the film is projected and, generally, other hydrodynamic factors.

With viscous fluids, such as the resins used in plural component spraying systems to manufacture plastic articles, high pressures of 1000 to 1500 p.s.i. are required. Such high operating pressures impose a strain on system components and a reduction in their reliability, require generally expensive components in the fluid delivery systems, and contribute to the problem of operating such systems safely. In addition, the use of high operating pressure frequently results in porosity in the manufactured product because of air entrapped by the viscous materials during their deposition. In internal mix spraying systems using airless atomization, such very high pressures are also required in the catalyst delivery system to avoid mixing of the catalyst and resin within components of the spraying apparatus other than the mixing chamber.

Even at high pressures, however, such fan-like films, because they are formed by the convergence of the fluid, include heavy streams at their edges which are referred to in the trade as "tails". Because of the heavy stream-like flow in the "tails", spray particles formed from these edge portions of the expanding fan produce particles which are generally unacceptably large. Past efforts to solve the problem of the "tails" attending the use of airless spray nozzles have included the insertion of a "preorifice" immediately behind the elongated, elliptical-shaped orifice to concentrate a greater portion of the flow in the central portion of the fan. Although preorifices are helpful, they are not fully satisfactory, adding another source of clogging to the spray gun and another variable factor to be integrated into system operation. Because of the problems attendant the use of airless atomization, uniform mixing of catalyst and resin is not always effected within the spray of particles formed by the airless spray nozzle; and thorough mixing of catalyst and resin frequently depends upon the manipulation of the spray gun by the system operator.

Another effort to avoid the problems attending the use of airless spray nozzles and to provide greater flexibility in their use has been to assist the airless atomization with the use of compressed air jets. The air-assisted, airless atomization sprayers generally in use in prior plural component spraying systems have included a plurality of very small, precisely located, compressed air orifices positioned around the airless spray nozzle to direct a plurality of air jets at the fan-shaped film formed by the airless nozzle and, particularly, at the "tails" formed at the extremities of the film. The plurality of jets of compressed air forms areas of low-pressure and turbulence through which the extremities of the fan-shaped film were projected, thus atomizing the "tails" into spray particles of acceptable size. Although the use of such small, precisely located air orifices can improve the mixing of the resin and catalyst in an internal mix, plural component system, their effects are generally localized to obtain atomization of the "tails".

SUMMARY OF THE INVENTION

The present invention provides an internal mix, air-assisted, airless atomization, plural component spraying system which is less expensive to manufacture, operate, and maintain and which provides a more effective air-assisted, airless atomization, permitting a reduction of liquid pressure and a more effective use of compressed air. In the invention, a low-volume flow of compressed air is imposed upon mixed resin and catalyst projected from an airless nozzle at lower than normal fluid pressures to effectively atomize and further mix the mixed resin and catalyst and, particularly, the tails, as small, uniformly sized particles; and resin and catalyst are also more effectively mixed within the spray gun in a manner that permits a substantial and significant reduction in the liquid pressure of the catalyst source.

Apparatus of the invention includes a first source of resin, a second source of catalyst for the resin, spraying means to mix the catalyst with the resin and to direct mixed catalyst and resin at an article-forming substrate, resin delivery means to provide a flow of resin from the first source to the spraying means, catalyst delivery means to provide a flow of catalyst from the second source to the spraying means, and air delivery means to provide a flow of compressed air to the spraying means. The spraying means comprises a means for mixing the flowing resin and catalyst in a substantially more uniform manner and at substantially reduced fluid pressures, particularly of the catalyst delivery means, a liquid nozzle for forming the mixed resin and catalyst into a fan-like film with expanding edges extending from a liquid orifice, and an air nozzle forcing the flow of compressed air to converge at an elongated air orifice and expand in a fan-like flow, the liquid nozzle and the air nozzle being positioned such that the expansion and fan-like flow of compressed air interacts with the fan-like film of mixed resin and catalyst and its expanding edges to assist in its uniform atomization and to further mix the mixed catalyst and resin particles.

The mixing means is located within the spraying means and forms a first passageway connected with the resin delivery means having a central portion of restricted diameter, an enlarged chamber downstream of the central portion, and an expanding nozzle portion between the central portion and enlarged chamber. One or more second passageways open into the central portion of the first passageway and are connected with the catalyst delivery means. A small diameter rod is located in the central portion of the first passageway to intersect the flowing resin and the catalyst from the second passageways. A baffle member is preferably located in the enlarged chamber of the mixing means, and the resin and catalyst are mixed within the mixing means prior to their delivery to the spray nozzle assembly.

In a preferred embodiment, the airless liquid nozzle is of generally conventional design in that it includes an internal passageway terminating at an internal hemispherical surface which is cut through by an external, V-shaped groove to form an elongated, elliptical-shaped, liquid orifice. The air nozzle is positioned adjacent to the liquid nozzle and comprises an annular chamber terminated at its forward end by an internal, generally hemispherical-shaped surface which is also cut through by an external, V-shaped groove to form an elongated, elliptical-shaped, air orifice. The design and location of the air orifice form a flow of compressed air which is generally juxtaposed around the fan-like film of mixed resin and catalyst and which includes a greater mass flow of compressed air at the edges of the fan-like film at which the "tails" exist. The compressed air flow will, therefore, provide preferential assistance in the atomization of the "tails" to provide a spray in which the mixed resin and catalyst particles are of more uniform size.

The air-assisted, airless nozzle assembly of the present invention permits more complete and effective atomization of the liquid resin and catalyst and more uniform mixing of mixed catalyst and resin particles at liquid pressures and air volumes substantially lower than those commonly used in the prior art. Systems incorporated into the present invention, for example, may effectively operate with liquid pressures as low as 300–500 p.s.i.

Further advantages and specific details of the invention will be set forth hereafter in conjunction with the detailed description of the preferred embodiment.

DETAILED DESCRIPTION OF THE PREFERRED EMBODIMENT

Figure 1:
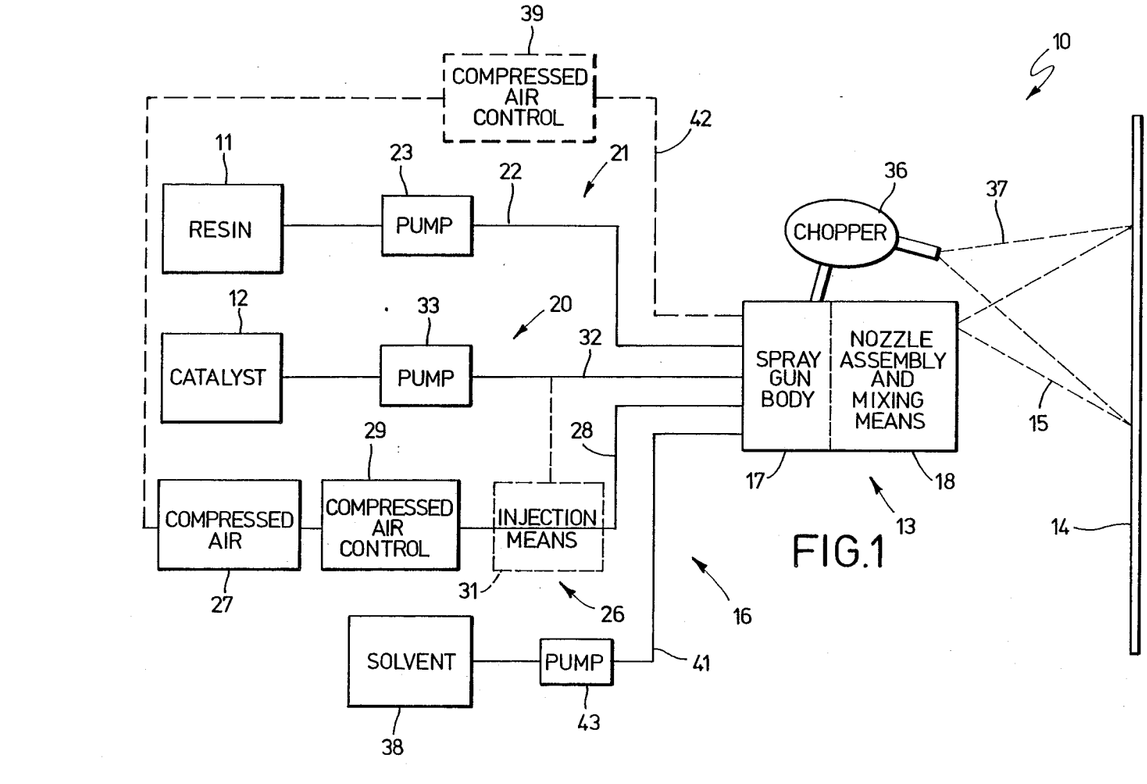
FIG. 1 schematically illustrates an internal mix, air-assisted, airless atomization, plural component spraying system according to a presently preferred embodiment of the invention.

FIG. 1 schematically illustrates an internal mix, air-assisted, airless atomization, plural component spraying system according to a presently preferred embodiment of the invention. The system is generally designated by reference numeral 10 and includes a first source 11 of a first component, e.g., a resinous material; a second source 12 of a second component, e.g., a catalyst for the resinous material; spraying means 13 for mixing the catalyst and resin and for directing the mixture at a substrate 14; and delivery means 16 for delivering the resin, catalyst, and other materials to the spraying means during operation of the system.

Spraying means 13 preferably comprises a hand-held spray gun which includes a spray gun body 17 with a nozzle assembly and mixing means 18 at its front. Nozzle assembly and mixing means 18, which is described in detail below, comprises an air-assisted, airless atomization nozzle assembly in which resin and catalyst are mixed and in which compressed air and liquid pressure are combined in the atomization of the mixed resin and catalyst material. Thus, system 10 includes a compressed air source 27; and delivery means 16 includes air delivery means 26 including conduit 28 and compressed air control 29 for delivering compressed air to the spraying means 13. In addition, a flow of resin from source 11 is delivered under pressure to spraying means 13 via resin delivery means 21, which includes conduit 22 and pump 23; and a flow of catalyst from source 12 is delivered to spraying means 13 under pressure via catalyst delivery means 20 which includes conduit 32 and pump 33.

As described below, the flows of resin and catalyst into spraying means 13 are directed into and through a nozzle assembly and mixing means 18 which mixes the resin and catalyst and forms the mixed resin and catalyst flow into a fan-like film; and the flow of compressed air into spraying means 13 is directed through the nozzle assembly so that the compressed air will coact with the fan-like film externally of the spraying means, assist in atomization of the mixed resin and catalyst and, particularly, the tails of the fan-like film, and simultaneously further mix the mixed resin and catalyst particles.

The atomized resin-catalyst mixture from spraying means 13 is directed at substrate 14 as an expanding fan-like spray schematically illustrated at 15. Substrate 14 comprises an article-forming substrate such as a mold or preform used to manufacture articles from the catalyzed resin applied thereto. The resin can comprise any one of numerous materials such as a polyester or epoxy resin, and the catalyst comprises a material suitable for catalyzing the resin.

System 10 may include a chopper 36 mounted to spraying means 13 to dispense strands of fiberglass or the like into the spray pattern 15, as indicated at 37, to reinforce the plastic article and to act as a filler. Compressed air from source 27 through control 29 and conduit 28 drives an air motor in chopper 36 and can be used to remove any resin residue from the spraying means following a spraying operation. System 10 can include, if necessary, a second compressed air control 39 connected to spraying means 13 by conduit 42.

System 10 preferably also includes a solvent source 38 connected to spraying means 13 via a conduit 41 and a pump 43. The solvent is periodically caused to flow through spraying means 13 to flush out any catalyzed resin that may remain therein, as known to those skilled in the art.

Figures 2, 3:
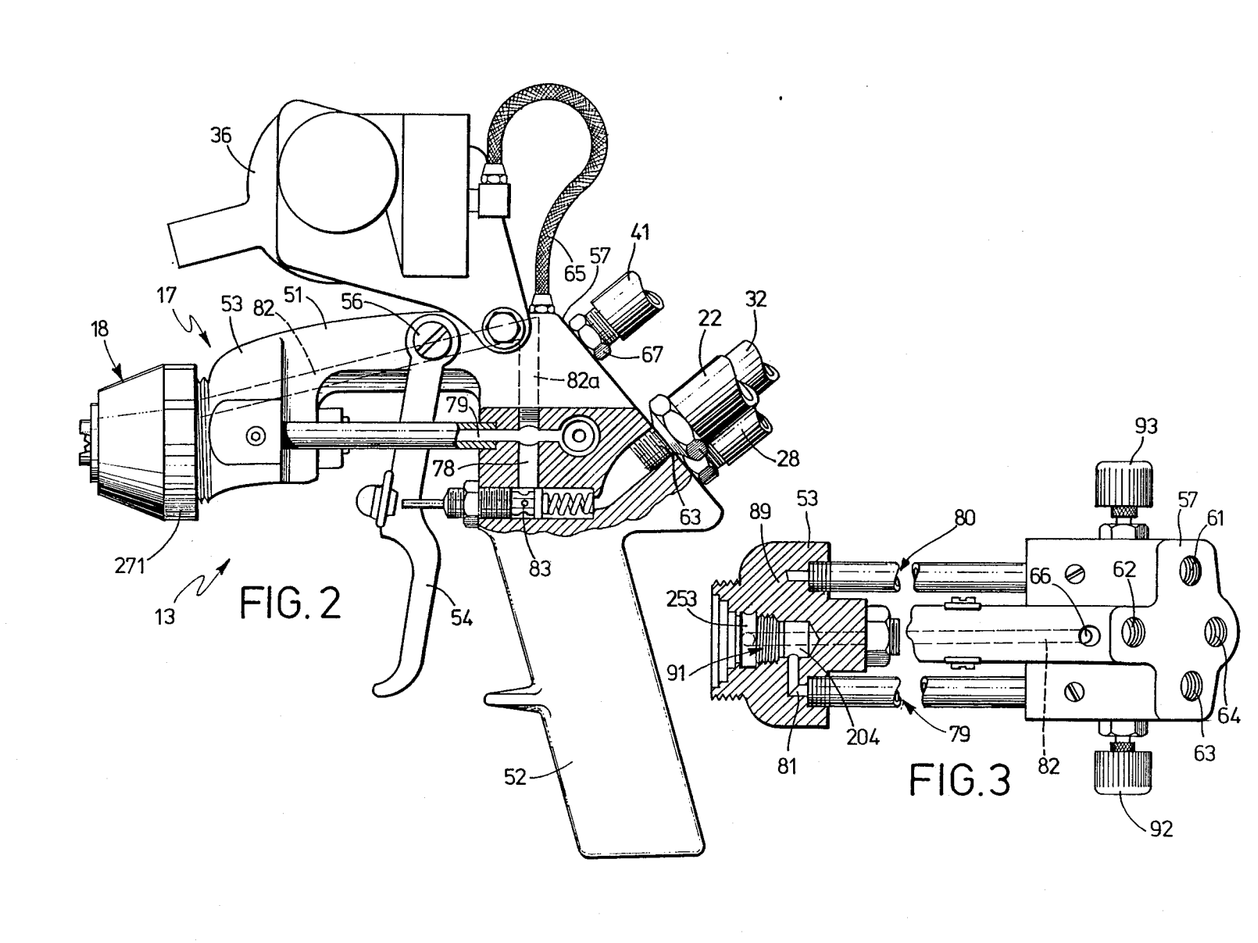
FIG. 2 is a partial cross-sectional view of the spray gun body of FIG. 1.
FIG. 3 is a top view of the spray gun body of FIG. 2, partially in section.

FIGS. 2 and 3 illustrate spraying means 13 in greater detail. As shown, spraying means 13 comprises a hand-held spray gun including a spray gun body 17 having a nozzle assembly and mixing means 18 affixed to the front end thereof. As shown in FIG. 2, gun body 17 includes a body portion 51, a handle portion 52, and a head portion 53. A trigger 54 is movably attached to body portion 51 by an axle or pin 56.

The rear face of body portion 51 of spray gun body 17 defines a mounting platform 57 having a plurality of openings 61, 62, 63, and 64 therein (see FIG. 3). Openings 61–64 comprise inputs to a plurality of passageways within the spray gun body through which the catalyst, resin, compressed air, and solvent are caused to flow during operation of the spray gun. As shown in FIG. 2, compressed air from source 27 (FIG. 1) is adapted to be connected to opening 64 by conduit 28. Opening 63 is adapted to be connected to resin source 11 via conduit 22, and opening 61 is adapted to be connected to catalyst source 12 via conduit 32. Opening 62 is connected to solvent source 38 by conduit 41. The various conduits are connected to the gun body by appropriate hose couplings such as illustrated at 67 in FIG. 2. As shown in FIG. 2, platform 57 is preferably angled at about 30°–60° from the horizontal to conveniently connect the gun to hoses or other conduits carried by overhead booms or over an operator's shoulder.

As shown in FIGS. 2 and 3, resin flowing into spray gun body 17 through opening 63 from line 22 flows through passageway 76, a valve assembly 83, and passageways 78 and 79 in gun body portion 51 and through passageway 81 in the head portion 53 and into the nozzle assembly and mixing means 18. Catalyst flows into the spray gun body through opening 61 and flows through similar passageways and a valve assembly (not shown) to passageway 80 in gun body 17 and passageway 89 in head portion 53 into nozzle assembly and mixing means 18. As shown in FIG. 3, passageway 89 opens into annular chamber 253, shown in FIGS. 4 and 5. Compressed air flows into the spray gun body through opening 64 and flows through passageways and a valve assembly (not shown) to passageways 82 and 82a in spray gun body, and through passageways 86, 87, and 88 in head portion 53 into nozzle assembly and mixing means 18. The compressed air valve assembly is located in the central plane of body portion 51 adjacent the trigger 54. Operation of resin valve assembly 83 and the valve assemblies in the catalyst and compressed air lines (which may be substantially identical to valve assembly 83) and, hence, control of the flow of resin, catalyst, and compressed air through the spray gun, is achieved by depressing and releasing the trigger 54.

Where a chopper is used, compressed air from source 27 is controlled by the compressed air valve assembly (not shown) which is operated by squeezing trigger 54. The compressed air to drive the pneumatic chopper motor of chopper 36 is thus controlled by trigger 54 and directed through passageway 82a to opening 66 (FIG. 3) which is connected to the chopper drive motor by a flexible conduit.

The flow of solvent from solvent source 38 into and through passageways in gun body 17 is controlled by manually operated valves 92 and 93. Operation of valves 92 and 93, for example, opens passageways leading from gun opening 62 to resin passageway 79 and catalyst passageway 80, respectively, to flush out the nozzle assembly and mixing means 18, as is known to those skilled in the art.

FIGS. 4–8 illustrate the nozzle assembly and mixing means 18 incorporated into spraying means 13 of the system of the invention. Nozzle assembly and mixing means 18 is shown in assembled form in FIG. 4 affixed to the head portion 53 of spray gun body 17, and in exploded form in FIG. 5. Basically, nozzle assembly and mixing means 18 comprises a mixing means 205, a liquid nozzle 201 for forming a mixed resin and catalyst flow into a fan-like film with expanding edges extending from a liquid orifice, and an air nozzle 231 for forming a flow of compressed air into a fan-like flow extending from an air orifice. The air nozzle 231 and the liquid nozzle 201 are positioned and oriented relative to one another so that the expansion and fan-like flow of compressed air will interact with the fan-like mixed resin and catalyst film and its expanding edges to assist in atomization of the film and to further mix the mixed catalyst and the resin particles.

Figures 4, 6, 7, 8:
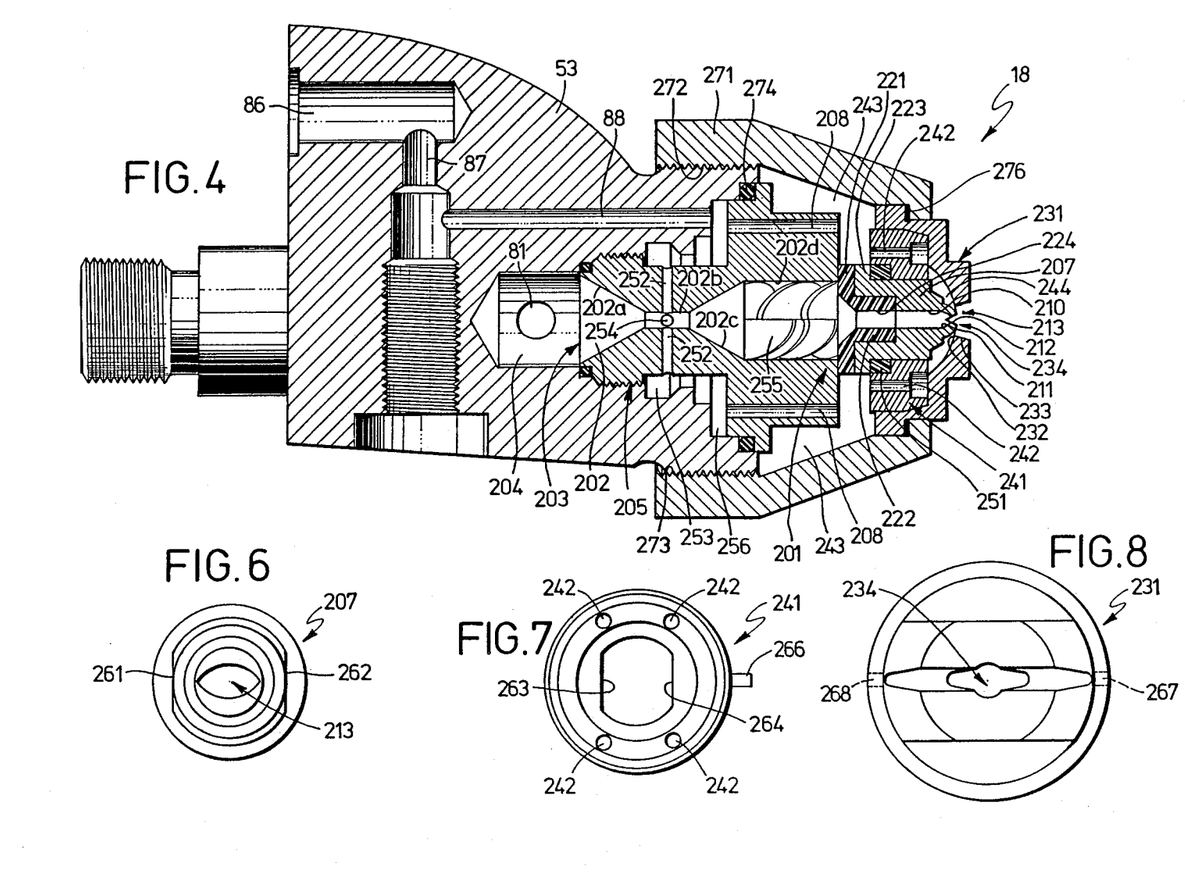
FIG. 4 is a cross-sectional view illustrating the nozzle assembly of FIG. 1 affixed to the head of the spray gun body.
FIG. 6 is a front end view of the liquid nozzle spray tip of FIGS. 4 and 5.
FIG. 7 is a front end view of the spray tip holder of FIGS. 4 and 5.
FIG. 8 is a front end view of the air nozzle of FIGS. 4 and 5.
Figure 5:
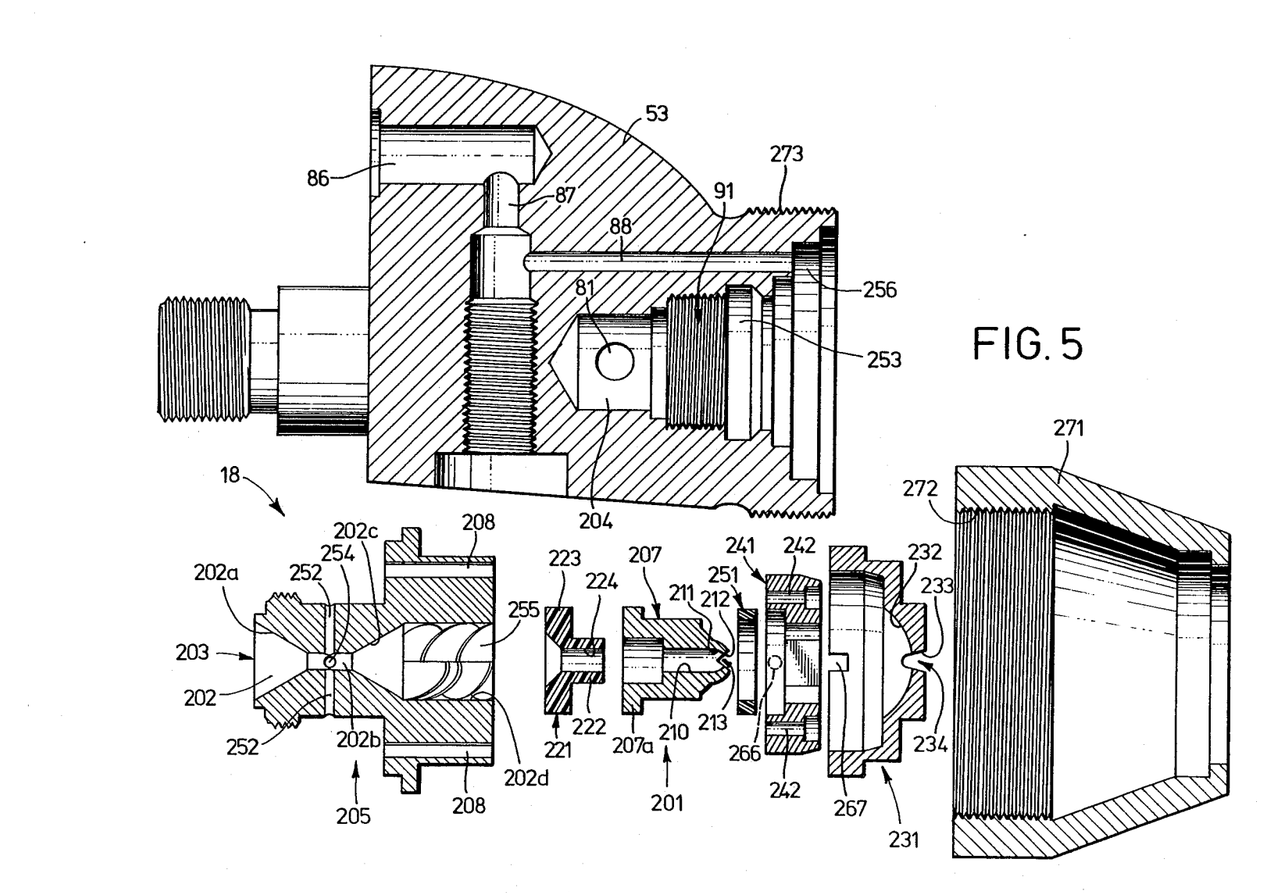
FIG. 5 is an exploded view of the assembly of FIG. 4.

With reference to FIGS. 4 and 5, liquid nozzle 201 comprises a separate liquid spray tip portion 207. Mixing means 205 comprises a generally cylindrical-shaped member of aluminum or the like having a central, generally venturi-shaped passageway 202 extending longitudinally therethrough. Passageway 202 includes a tapered portion 202a, a central portion 202b of restricted diameter, an expanding nozzle portion 202c, and an enlarged chamber portion 202d. One or more radial passageways 252 (two opposed, radial passageways are illustrated in FIGS. 4 and 5) open into restricted central passageway 202b and connect central passageway 202b to annular chamber 253 formed within the assembly when the assembly is mounted within the cavity 91 provided in the head portion 53 of spray gun body 17 (FIG. 3). A small rod 254 traverses the restricted portion 202b of the central passageway 202 in the plane of the radial passageways 252, lying preferably at right angles to passageways 252. The small rod is located to intersect the flowing resin and create turbulent flow of the resin and catalyst within passageway 202 of mixing means 205. The diameter of small rod 254 is a significant percentage of the diameter of the restricted portion 202b of passageway 202, preferably about twenty-five percent to about fifty percent.

A baffle member 255 is preferably positioned within passageway chamber portion 202d to further mix the resin and catalyst as shown in FIGS. 4 and 5. Baffle member 255 may be manufactured by cutting an appropriate length of baffle, e.g., preferably about one-half inch from Stata-tube Part No. 5-3P manufactured by TAH Industries, Inc., of Imlaystown, N.J. 03526. Such baffle comprises pluralities of vanes located in adjacent halves of a cylindrical configuration with the plurality of vanes in one-half of the configuration being arranged at right angles to the plurality of vanes in the other half of the configuration, and both of the pluralities of vanes lying at about forty-five degrees (45°) with respect to the longitudinal axis of the baffle member.

When nozzle assembly and mixing means 18 is mounted in cavity 91 of gun body 17, central passageway 202 in mixing means 205 is open to chamber 204 in head portion 53 and is adapted to receive a flow of resin entering into passageway portion 202a through input end 203 from chamber 204. Catalyst from source 12 flows into annular chamber 253 and then flows through radial passageways 252 into restricted venturi portion 202b of passageway 202. Catalyst is thus injected at relatively low pressure and drawn into flowing resin in portion 202b of passageway 202 from the plurality of passageways 252. Mixing of the resin and catalyst begins in passageway portion 202b because of the turbulent flow due in to small rod 254 and continues in the expanding nozzle portion 202c and enlarged chamber 202d where the resin and catalyst are further mixed by baffle member 255. Because of the venturi effect of the passageway 202, mixing means 205 substantially and significantly reduces the liquid pressure of the catalyst delivery system. Since the energy represented by the resin delivery system is largely kinetic energy in the central portion 202b of the mixing means, catalyst may be introduced into the resin stream at substantially lower fluid pressures; and there is a substantially reduced opportunity for resin to be forced into the components of the catalyst delivery system.

After mixing, the mixed resin and catalyst is then urged forwardly into and through spray tip portion 207 of liquid nozzle 201.

Mixing means 205 also includes a plurality of relatively narrow, longitudinal passageways 208 (e.g., four passageways) around the periphery thereof. Passageways 208 are adapted to receive a flow of compressed air from passageways 86, 87, and 88 and annular chamber 256 in head portion 53 of gun body 17, as will be described more fully hereinafter.

Spray tip 207, also shown in FIG. 6, is mounted at the end of mixing means 205 and includes an internal, central passageway 210 aligned with passageway 202 in mixing means 205. Passageway 210 terminates at an internal, generally hemispherical surface 211 which is cut through by an external, V-shaped groove 212 to define an elongated, elliptical-like, liquid orifice 213. Spray tip 207 may be constructed of tungsten carbide or another suitable material.

As is known in the spraying art, liquid nozzle 201 comprises an airless spray nozzle for atomizing the mixed resin and catalyst. Mixed resin and catalyst flowing through nozzle 201 is forced by the hemispherical termination of the passageway 210 to converge in its flow at and through the elongated orifice 213. Because of the converging flow at the orifice 213, the liquid material is expelled through the orifice into an expanding fan-like film which breaks into spray particles of resin and catalyst which are carried by their momentum to the substrate 14 (FIG. 1) or other target.

Nozzle assembly and mixing means 18 further includes a nozzle seal 221 positioned between mixing means 205 and spray tip 207 to prevent leakage therebetween. Nozzle seal 221 comprises an annular sealing member having a portion 222 which extends into the internal passageway 210 of spray tip 207, and an annular shoulder portion 223 that is positioned between the nozzle body and the spray tip to seal therebetween. Nozzle seal 221 has an internal passageway 224 that is aligned with the passageway 210 in the spray tip when the seal is inserted into the spray tip. Nozzle seal 221 is sized to fit rather snugly within spray tip 207 but is removable for replacement whenever necessary.

As described previously, the fan-like film formed by a conventional airless nozzle typically includes heavy streams at its expanding edges which are referred to as "tails"; and the liquid in such "tails" frequently forms particles which are unacceptably large. Air nozzle 231 provides a flow of compressed air juxtaposed to liquid nozzle 201 which assists in atomization of the fan-like film of mixed catalyst resin into particles of a smaller, more uniform size, while simultaneously further mixing the mixed catalyst and resin particles externally of the apparatus. Air nozzle 231, which is also shown in FIG. 8, comprises a dome-shaped member having a generally hemispherical, internal surface 232 which is cut through by an external, V-shaped groove 233 to form an elongated, somewhat elliptical, air orifice 234. Air nozzle 231 is positioned with respect to liquid spray tip 207 so that the elongated air orifice 234 is aligned with the elongated liquid orifice 213 with their long dimensions lying in the same direction.

Air nozzle 231 is supported in position relative to liquid nozzle 201 by spray tip holder 241 (see also FIG. 7) which functions to both space the air nozzle from the liquid nozzle and to maintain the two nozzles properly aligned with respect to one another. A spacer ring 251 is positioned around the spray tip 207 and rests upon the shoulder portion 207*a* of spray tip 207. Spacer ring 251 cooperates with spray tip holder 241, as shown in FIG. 4, to help position the air nozzle longitudinally with respect to the liquid nozzle and liquid orifice 213. Spray tip holder 241 includes a plurality of passageways 242 extending therethrough for the passage of compressed air from annular chamber 243 into dome-shaped chamber 244 beneath dome-shaped surface 232.

Upon operation of the trigger 54 of the spray gun body 17, compressed air flows through passageways 82 and 82*a* in gun body 17, and passageways 86, 87, and 88 and annular chamber 256 in head portion 53 of gun body 17, and flows through passageways 208 in mixing means 205 into annular chamber 243; resin flows through the passageways 79 in the gun body 17, including passageways 81 and 204 in the head portion 53 of gun body 17 and through passageway 202 of mixing means 205; and catalyst flows through passageway 80 in the gun body 17, and passageway 89 in head portion 53, into annular chamber 253 and through radial passageways 252 in mixing means 205. The resin and catalyst combine and mix in restricted passageway portion 202*b* and flow through and are further mixed in passageway portions 202*c* and 202*d* and baffle 255 and flow further into spray tip portion 207. The mixed resin and catalyst is formed by spray tip portion 207 into an expanding fan-like film. From annular chamber 243, the compressed air flows through passageways 242 in spray tip holder 241 into the chamber 244 beneath hemispherical surface 232 in the air nozzle. The flow of compressed air is forced to converge at the elongated orifice 234 and, it is believed, expands outwardly in a fan-like flow with a concentrated mass flow at its edges. The expanding flow of compressed air is juxtaposed around the fan-shaped liquid film formed by the spray tip portion 207, and provides a greater mass flow of compressed air juxtaposed to the expanding edges of the fan-like film to provide a concentration of the atomizing effect of the compressed air in the area of the "tails" formed by the liquid nozzle 207, thus providing preferential assistance to atomize the "tails" of the film to reduce the size of mixed resin and catalyst particles in the area of the tails and to provide a spray of substantially uniform sized particles.

The flow of the compressible air fluid is substantially like the flow of the incompressible mixed resin and catalyst fluid in the sense that both are urged to converge at elongated orifices which are generally coaxial and generally coplanar along their central axes. Because, however, the liquid nozzle and the compressed air nozzle share a common axis, the flow of air directed at and acted upon by the generally hemispherical surface at the inside of the air nozzle is generally annular in cross-section prior to its interaction with the hemispherical internal surface of the air nozzle.

The various components forming nozzle assembly and mixing means 18 are assembled by concentrically nesting one part upon or within another. Specifically, to assemble nozzle assembly and mixing means 18, mixing means 205 is positioned in the opening 91 provided in the head portion 53 of spray gun body 17, preferably by threading it into opening 91. Baffle 255 is positioned in passageway portion 202*d*. The spray nozzle assembly, including the airless nozzle 201 and air nozzle 231, are next assembled. Nozzle seal 221 is inserted in spray tip 207, and spacer ring 251 is positioned therearound. Spray tip holder 241 is then positioned over the spray tip 207.

As shown in FIG. 6, spray tip 207 includes a pair of opposed flat external surfaces 261 and 262 extending lengthwise thereon. As shown in FIG. 7, spray tip holder 241 includes a pair of opposed, flat, internal surfaces 263 and 264. To insert spray tip holder 241 over spray tip 207, surfaces 263 and 264 must be aligned with surfaces 261 and 262, respectively. Accordingly, surfaces 261–264 function as first alignment means to automatically angularly orient the spray tip holder with respect to the spray tip.

As also shown in FIG. 7, spray tip holder 241 includes a small peg 266 extending outwardly therefrom. Peg 266 is adapted to be received within one of a pair of diametrically opposed slots 267 and 268 formed in the side of air nozzle 231 as shown in FIG. 8 when air nozzle 231 is inserted over spray tip holder 241. Thus, peg 266 and slots 267 and 268 function as second alignment means to automatically angularly orient the air nozzle with respect to the spray tip holder.

The first and second alignment means thus ensure that the liquid orifice 213 in spray tip 207 will be in proper alignment with the air orifice 234 in air nozzle 231 for proper operation of the nozzle assembly whenever the nozzle components are assembled together.

Following assembly of the air nozzle, an external retaining ring 271 is positioned over the assembled components to hold the components together and to mount the spray nozzle assembly to the spray gun body. Retaining ring 271 preferably includes a threaded portion 272 to engage a threaded surface 273 on the head portion 53 of the spray gun body to firmly hold the nozzle assembly on the spray gun body while permitting easy removal therefrom for servicing or replacement. O-ring seals are preferably provided at 274 and 276 to prevent leakage between the retaining ring and other components of the apparatus.

The nozzle assembly and mixing means of the present invention can be easily disassembled for servicing whenever necessary, and then quickly reassembled for use. The invention, in particular, permits rapid replacement of the liquid nozzle spray tip 207 without replacing the entire liquid nozzle. Ease in replacement of spray tip 207 is an important capability because liquid orifice 213 tends to clog because of its small size and frequently needs replacement. The separate spray tip 207 also permits the spray tip to be used with nozzle bodies of different configuration for different applications. The present invention thus reduces equipment downtime and the cost of replacement and inventory of parts.

In assembling the nozzle structure, the first and second alignment means provides proper, automatic alignment of the liquid and air orifices to ensure proper operation of the spray gun. The basic method of air-assisted, airless atomization of the invention permits less criticality in the location of air and liquid nozzles and thus greatly simplifies the assembly procedure.

The nozzle assembly and mixing means 18 of the present invention permits fluid pressures required to operate the spraying system to be significantly reduced to as low as 300-500 p.s.i. as compared to prior systems which operate at substantially higher pressures of, for example, 1000-1500 p.s.i. Specifically, by delivering the catalyst radially to the restricted venturi passageway portion 202b, the fluid pressure of the catalyst urges the catalyst into the resin flowing longitudinally through passageway 202 without imposition of resin fluid pressure on the catalyst. The spray nozzle 201 combines the low fluid pressure at spray tip orifice 213 and the low flow of compressed air from air orifice 234 to provide efficient and effective atomization of the mixed resin and catalyst and further mixing of the mixed resin and catalyst particles externally of the apparatus. The construction of the nozzle assembly and mixing means 18 thus permits the fluid pressures of the system to be substantially reduced.

Although it will not normally be necessary, if desired, catalyst can, in addition to being internally mixed with resin in nozzle assembly and mixing means 18, also be injected into the resin externally of the system by mixing catalyst with the compressed air used to assist in atomization. Catalyst can be mixed with the compressed air, utilizing a fluid-mixing valve such as disclosed in U.S. Pat. No. 3,763,876, which is incorporated herein by reference. The catalyst injection means can be incorporated into system 10 as shown in dotted line at 31 in FIG. 1 to permit some of the catalyst in conduit 32 to be directed into injection means 31 to be injected into the compressed air from source 27.

While what has been described constitutes a presently most preferred embodiment, the invention can take many other forms. Accordingly, it should be understood that the invention is to be limited only insofar as is required by the scope of the following claims.

I claim:

1. Means for forming an article from a catalyzed, resinous material, comprising:
a first source of resin;
a second source of catalyst for said resin;
spraying means to mix said catalyst with said resin and to direct mixed catalyst and resin at an article-forming substrate;
resin delivery means to provide a flow of resin from said first source to said spraying means;
catalyst delivery means to provide a flow of catalyst from said second source to said spraying means; and
air delivery means to provide a flow of compressed air to said spraying means,
said spraying means comprising mixing means connected with said resin delivery means and said catalyst delivery means for mixing said flowing resin and catalyst, said mixing means being located within the spraying means and forming a first passageway having a central portion of restricted diameter, an enlarged chamber downstream of the central portion and an enlarging portion between the central portion and enlarged chamber, a baffle member being located in said enlarged chamber, one or more second pasageways opening into the central portion of the first passageway, and turbulence-inducing means located adjacent the one or more passageway openings of the central portion of the first passageway, said first passageway being connected with the resin delivery means and said one or more second passageways being connected with said catalyst delivered means whereby the resin and catalyst are mixed by the mixing means, a liquid nozzle for forming the mixed and flowing resin and catalyst into a fan-like film with expanding edges extending from a liquid orifice, and an air nozzle forcing the flow of compressed air to expand from adjacent the liquid orifice,
said liquid nozzle and said air nozzle being positioned so that the expansion of compressed air intereacts with the fan-like mixed resin and catalyst film and its expanding edges to assist in the formation of resin and catlyst particles and further mix the catalyst and resin.

2. The means of claim 1 wherein the liquid nozzle includes an internal passageway terminating in a hemispherical surface and said liquid orifice is formed by a V-shaped external groove intercepting the internal, hemispherical surface to form an elongated liquid orifice, and wherein said air nozzle forms an annular chamber being terminated at its forward end with a spherically shaped, internal, surface portion and an elongated air orifice, said flow of compressed air through said elongated air orifice assisting the uniform size formation of catalyst and resin spray particles by its greater mass flow juxtaposed to the expanding edges of the fan-like film.

3. The means of claim 1 wherein the mixing means is a replaceable fluid nozzle within the spraying means.

4. The means of claim 2 wherein said liquid nozzle includes a nozzle body portion and a spray tip portion, said nozzle body portion and said spray tip portion having aligned internal passageways, the internal passageway in said spray tip portion terminating in said hemispherical surface having said liquid orifice therein, and wherein said mixing means is located in said nozzle body portion.

5. The means of claim 1 and further including alignment means on said liquid nozzle and on said air nozzle for automatically aligning said liquid orifice with said air orifice when said liquid nozzle and said air nozzle are assembled.

6. The means of claim 5 wherein said apparatus further includes a nozzle holder for supporting said air nozzle, said nozzle holder and said liquid nozzle including first alignment means for automatically angularly orienting said liquid nozzle with said nozzle holder and wherein said air nozzle and said nozzle holder include second alignment means for automatically angularly orienting said air nozzle with respect to said nozzle holder for automatically aligning said liquid orfice with said air orifice.

7. The means of claim 1 wherein said spraying means comprises a hand-held spray gun.

8. The means of calim 1 wherein the central portion fo restricted diameter includes two opposed radial passageways opening into said restricted portion of said internal passageway and wherein said turbulence-inducing measn includes a small rod extending transversely across the restricted diameter portion of the central pasageway in the plane and at right angles to the radial passageways.

9. The means of claim 1 wherein said turbulence-inducing means comprises a small rod traversing the central portion of said first passageway.

10. The means of claim 9 wherein the diameter of said small rod is about 25 percent to about 50 percent of the diameter of said central passageway portion.

11. A method of forming an article from a catalyzed resinous material, comprising:
   delivering a flow of resin to a spraying means, said resin being forced by resin fluid pressure to flow through a restricted venturi passageway portion within the spraying means;
   delivering a flow of catalyst to said spraying means, said catalyst being delivered by catalyst fluid pressure to an opening in the restricted passageway portion through which said resin flows;
   mixing the flow of catalyst into the flowing resin at said spraying means to create a flow of mixed resin and catalyst, said catalyst being mixed into the flowing resin without imposition of the resin fluid pressure on the catalyst at said opening whereby catalyst fluid pressure may be substantially reduced;
   delivering a flow of compressed air to said spraying means;
   forming the mixed resin and catalyst flow into a fan-like film with expanding edges extending from the spraying means;
   forcing the flow of compressed air to converge adjacent the fan-like film of mixed resin and catalyst and expand in a fan-like flow juxtaposed to said fan-like film of mixed resin and catalyst, said expanding flow of compressed air being concentrated adjacent the expanding edges of the fan-like film to provide assistance in the atomization of the expanding edges of the film and more uniform size particles of resin and catalayst; and
   directing the mixed resin and catalyst particles to an article-forming substrate where the resin and catalyst react to form an article.

12. Means for forming an article from a catalyzed, resinous material, comprising:
   a first source of resin;
   a second source of catalyst for said resin;
   spraying means comprising mixing means to mix said catalyst with said resin and an atomizer to direct a spray of mixed catalyst and resin at an article-forming substrate;
   resin delivery means to provide a flow of resin from said first source to said spraying means;
   catalyst delivery means to provide a flow of catalyst from said second source to said spraying means; and
   air delivery means to provide a flow of compressed air to said spraying means,
   said mixing means comprising a first passageway having a central portion of restricted diameter, an enlarged chamber downstream of the central portion, and an expanding portion between the central portion and enlarged chamber, and one or more second passageways opening into the central portion of the first passageway and a small rod extending across the restricted central portion of the first passageway, said first passageway being connected with the resin delivery means and said one or more second passageways being connected with said catalyst delivery means whereby the resin and catalyst are mixed in the mixing means,
   said atomizer comprising a liquid nozzle for forming the mixed and flowing resin and catalyst into a fan-like film with expanding edges extending from a liquid orifice, and an air nozzle forcing the flow of compressed air to converge at an elongated orifice and to expand in a fan-like flow and to assist in the formation of resin and catalyst particles and further mix the catalyst and resin.

13. The spraying system of claim 12 wherein said mixing means further includes a baffle-type mixer located in the enlarged chamber portion of the internal passageway.

14. An internal mix system for plural component materials, comprising:
   a first source of a first plural component material;
   a second source of a second plural component material reactive with said first plural component material;
   mixing means for mixing said second plural component material with said first plural component material, said mixing means including a first passageway having a central portion of restricted diameter, an enlarged chamber downstream of the central portion and an enlarging portion between the central portion and enlarged chamber, one or more second passageways opening into the central portion of the first passageway, and turbulence-inducing means adjacent the one or more pasageway openings of the central portion of the first passageway, said turbulence-inducing means comprising a small rod traversing the central portion of said first passageway;
   first delivery means to provide a flow of first plural component material from said first source to said first passageway of said mixing means;
   second delivery means to provide a flow of second plural component material from said second source to said one or more second passageways of said mixing means whereby said first and second plural component materials are mixed by the mixing means; and
   directing means for directing mixed first and second plural component materials from said system.

15. The system of claim 14 wherein said mixing means further includes a baffle member located in the enlarged chamber of the mixing means.

16. The system of claim 14 wherein the diameter of said small rod is about 25 percent to about 50 percent of the diameter of said central passageway portion.

17. A method of internally mixing plural component materials for direction to and curing on a substrate, comprising:
- delivering a flow of a first plural component material to a mixing means, said first plural component material being forced by fluid pressure to flow through a restricted venturi passageway portion within the mixing means;
- delivering by fluid pressure a flow of a second plural component material that is reactive with said first plural component material to said mixing means, said second plural component being delivered to an opening in the restricted venturi passageway portion through which said first plural component material flows;
- mixing the flow of second plural component material into the flowing first plural component material with a turbulence-inducing means adjacent the restricted venturi passageway of said mixing means to create a flow of mixed first and second plural component materials, said second plural component material being mixed into the flowing first plural component material without imposition of the fluid pressure of the first plural component material on the second plural component material at said opening whereby the fluid pressure of the second plural component material may be substantially reduced; and
- directing the flow of mixed first and second plural component materials to a substrate where the mixed first and second plural component materials cure.

18. The method of claim 17 wherein said mixing means is carried by a hand-held spray gun, comprising:
- delivering the flow of first plural component to said hand-held spray gun;
- delivering the flow of second plural component material to said hand-held spray gun;
- delivering a flow of compressed air to said hand-held spray gun; and
- projecting the flow of mixed first and second plural component materials from a spray nozzle of said hand-held spray gun and directing the flow of compressed air from said spray nozzle juxtaposed to said projected flow of mixed first and second components in effecting the direction by hand of particles of mixed first and second plural component materials at an article-forming substraste.

* * * * *

UNITED STATES PATENT AND TRADEMARK OFFICE
CERTIFICATE OF CORRECTION

PATENT NO. : 4,760,956

DATED : August 2, 1988

INVENTOR(S) : Gregory A. Mansfield

It is certified that error appears in the above-identified patent and that said Letters Patent is hereby corrected as shown below:

In col. 12, line 29, delete "delivered" and insert -- delivery -- therefor.

In col. 13, line 15 (claim 8, line 1), delete "calim" and insert -- claim -- therefor; line 16 (claim 8, line 2), delete "fo" and insert -- of -- therefor; line 19 (claim 8, line 5) delete "measn" and insert -- means -- therefor.

In col. 15, line 15 (claim 17, line 12), after "component" and before "being", insert -- material --.

Signed and Sealed this

Seventeenth Day of January, 1989

*Attest:*

DONALD J. QUIGG

*Attesting Officer*  *Commissioner of Patents and Trademarks*